United States Patent
Wang (10) Patent No.: US 6,389,918 B1
(45) Date of Patent: May 21, 2002

(54) UPPER AND LOWER LEVER TYPE SHIFT ASSEMBLY

(75) Inventor: Yong-Qiang Wang, Rochester Hills, MI (US)

(73) Assignee: Dura Automotive Systems, INC, Rochester Hills, NJ (US)

( * ) Notice: Subject to any disclaimer, the term of this patent is extended or adjusted under 35 U.S.C. 154(b) by 0 days.

(21) Appl. No.: 09/442,168

(22) Filed: Nov. 16, 1999

(51) Int. Cl.⁷ .............................................. B60K 20/00
(52) U.S. Cl. ..................... 74/473.1; 74/471 R
(58) Field of Search ............................ 74/473.1, 471 R; 192/4 A (56) References Cited

U.S. PATENT DOCUMENTS

| | | |
|---|---|---|
| 3,994,184 A | 11/1976 | Osborn |
| 4,989,473 A | 2/1991 | McMorris |
| 5,398,565 A | 3/1995 | Brock |
| 5,490,434 A | 2/1996 | Osborn et al. |
| 5,593,011 A * | 1/1997 | Harada .................. 192/4 A |
| 5,651,293 A * | 7/1997 | Ebenstein .................. 74/475 |

* cited by examiner

Primary Examiner—David Fenstermacher (57) ABSTRACT

An upper and lower lever type shift assembly is disclosed, suitable for use as a shifter for a motor vehicle. The shift assembly has a housing with a top opening and a side opening, an upper lever adapted to be connected to a shifter knob, a lower lever and a pivot block connecting the upper lever and the lower lever, wherein the pivot block is pivotably mounted in the housing, and a pivot cover cooperating with the housing to form a bearing surface for the pivot block proximate the side opening, wherein the pivot cover is connected to the housing by snap fit. The bearing surfaces cooperate with a pocket in the housing to support the pivot block. Such upper and lower type shift assemblies can be used to control, for example, transfer cases or transmissions of motor vehicles.

11 Claims, 7 Drawing Sheets

UPPER AND LOWER LEVER TYPE SHIFT ASSEMBLY

FIELD OF THE INVENTION

The present invention is directed to shift assemblies for motor vehicles, and more particularly to improvements in shift assemblies having an upper lever and a lower lever.

BACKGROUND OF THE INVENTION

Upper and lower lever type shift assemblies, or "shifters", are commonly used in motor vehicles to regulate either the transmission or the transfer case of a motor vehicle. In the example of a transfer case shifter, it is common for an upper lever to extend upwardly into a driver's compartment, and a lower lever operatively connected to the upper lever to extend beneath the floor to the transfer case. Actuation of the upper lever by the operator moves gears of the transfer case to one of several positions. These positions can typically include a 4 wheel drive high speed (4H), suitable for use when added traction is desired, as occurs in adverse weather conditions, a 4 wheel drive low speed (4L,) suitable for use in off-road soft terrain driving where the terrain demands both four-wheel drive and low range power, a 2 wheel drive (2H) suitable for use on normal highways and a neutral (N) position, desirable if the vehicle is to be towed.

Known upper and lower type shift assemblies comprise an upper lever connected to a lower lever by a block mounted inside a housing. The block pivots on a pin mounted on bearings in the housing. Several problems exist with such known designs. The housing typically requires complex machining to prepare an opening for the levers to extend into. Bearings must be inserted with the pin, and welds and/or mounting pins are needed to secure the block with the pin and with the levers. Of course, where mounting pins are used an opening must be provided which typically means additional machining of components. Moreover, when inserting a pin to connect a lever to a pivot block, high stresses may be introduced into the assembled part, reducing overall effectiveness of such assemblies.

There is a need for a shifter with fewer parts, less weight, less tooling and machining requirements and overall reduced cost while at least maintain high quality and reliability in shifting. In view of the foregoing, it is an object of the present invention to provide a shift assembly which is of simple and elegant construction and low cost, and which significantly reduces the overall number of parts and tooling required for assembly. In particular, it is an object of the present invention to eliminate the need for welds and corresponding weld tooling, and to eliminate the need for bearings separate from the housing. It is an additional object of the present invention to provide a shifter that is highly reliable in operation, and which can be manufactured efficiently. Additional objects and optional features of the invention will be apparent form the following disclosure and detailed discussion of preferred embodiments.

SUMMARY OF THE INVENTION

In accordance with a first aspect a shift assembly comprises a housing having a top opening and a side opening, an upper lever, a lower lever, a pivot block connecting the upper lever and the lower lever, wherein the pivot block is pivotably mounted in the housing and the upper lever extends through the top opening, and a pivot cover which cooperates with the housing to define a slot. The pivot block extends through the slot, and the pivot cover is connected to the housing by snap fit.

In accordance with another aspect a shift assembly has pivot block, a housing which defines a pocket and a pivot cover which cooperates with the housing to define a generally cylindrical slot, and the slot cooperates with the pocket to define bearing surfaces which receive the pivot block.

In accordance with another aspect, a shift assembly is formed wherein a pivot block and lower lever are formed together as a unitary or one-piece construction.

From the foregoing disclosure and the following more detailed description of various preferred embodiments, it will be apparent to those skilled in the art that the present invention provides a significant advance in the technology and art of shift assemblies.

Particularly significant in this regard is the potential the invention affords for reduced tooling costs and simplified construction of shift assemblies. Additional features and advantages of various preferred embodiments will be better understood in view of the detailed description provided below.

It should be understood that the appended drawings are not necessarily to scale, presenting a somewhat simplified representation of various preferred features illustrative of the basic principles of the invention. The specific design features of the shifter as disclosed here, including, for example, specific dimensions of the upper and lower levers will be determined in part by the particular intended application and use environment. Certain features of the illustrated embodiments have been enlarged or distorted relative to others to facilitate visualization and clear understanding. In particular, thin features may be thickened for example, for clarity of illustration. All references to direction and position, unless otherwise indicated, refer to the orientation of the transfer case shifter illustrated in the drawings. In general, up or upward refers to the top of the paper in FIG. 1 and down or downward refers to a direction towards the bottom of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the shift assembly disclosed here. The following detailed discussion of various alternative and preferred features and embodiments will illustrate the general principles of the invention with reference to a transfer case shifter for use in controlling the transfer case of a motor vehicle, and is particularly useful with a sport utility vehicle (SUV), or pickup truck. Other embodiments suitable for other applications, such as transmission shifters, will be apparent to those skilled in the art given the benefit of this disclosure.

Figure 1:
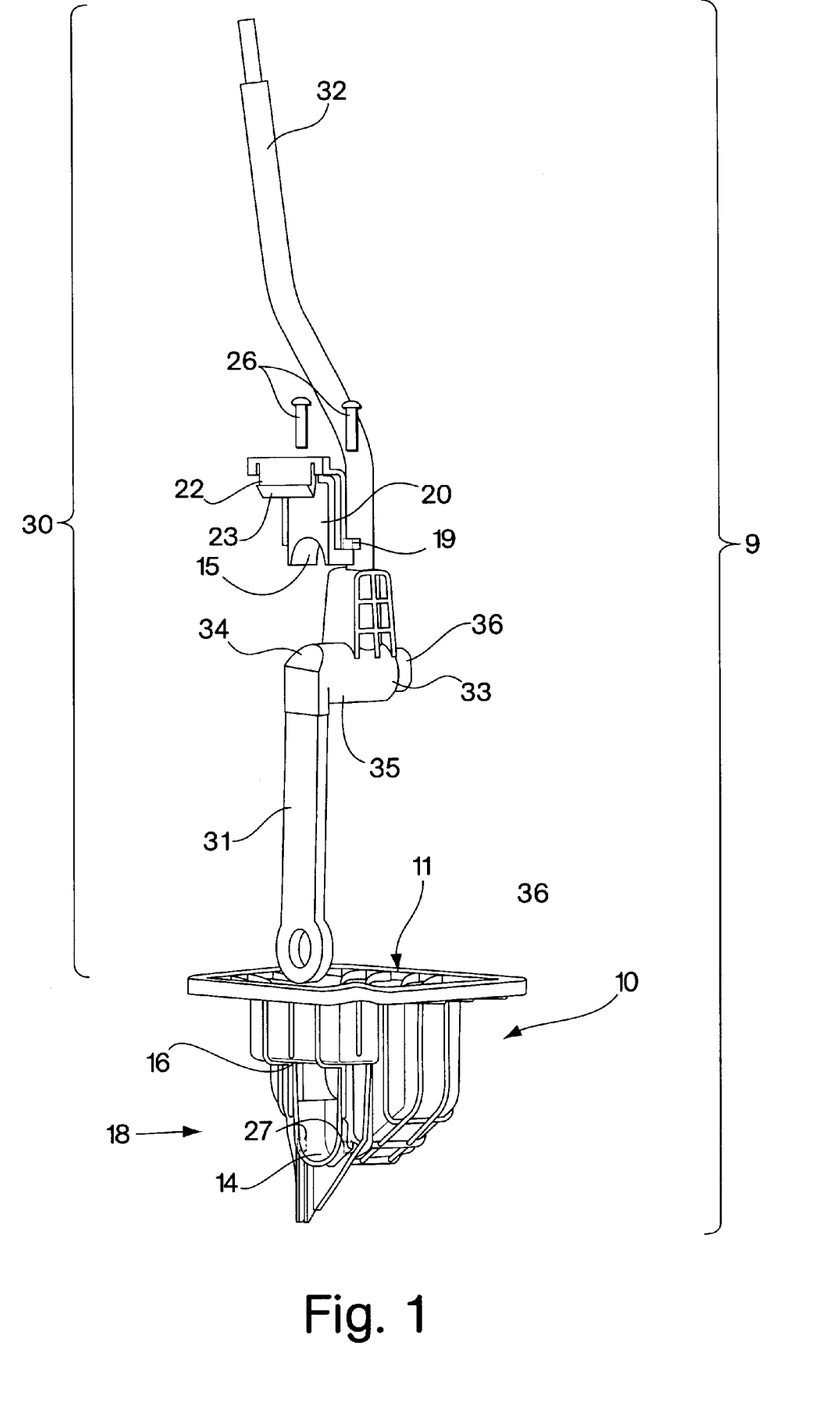
FIG. 1 is an exploded perspective view which illustrates a shift assembly in accordance with a preferred embodiment.
Figure 2:
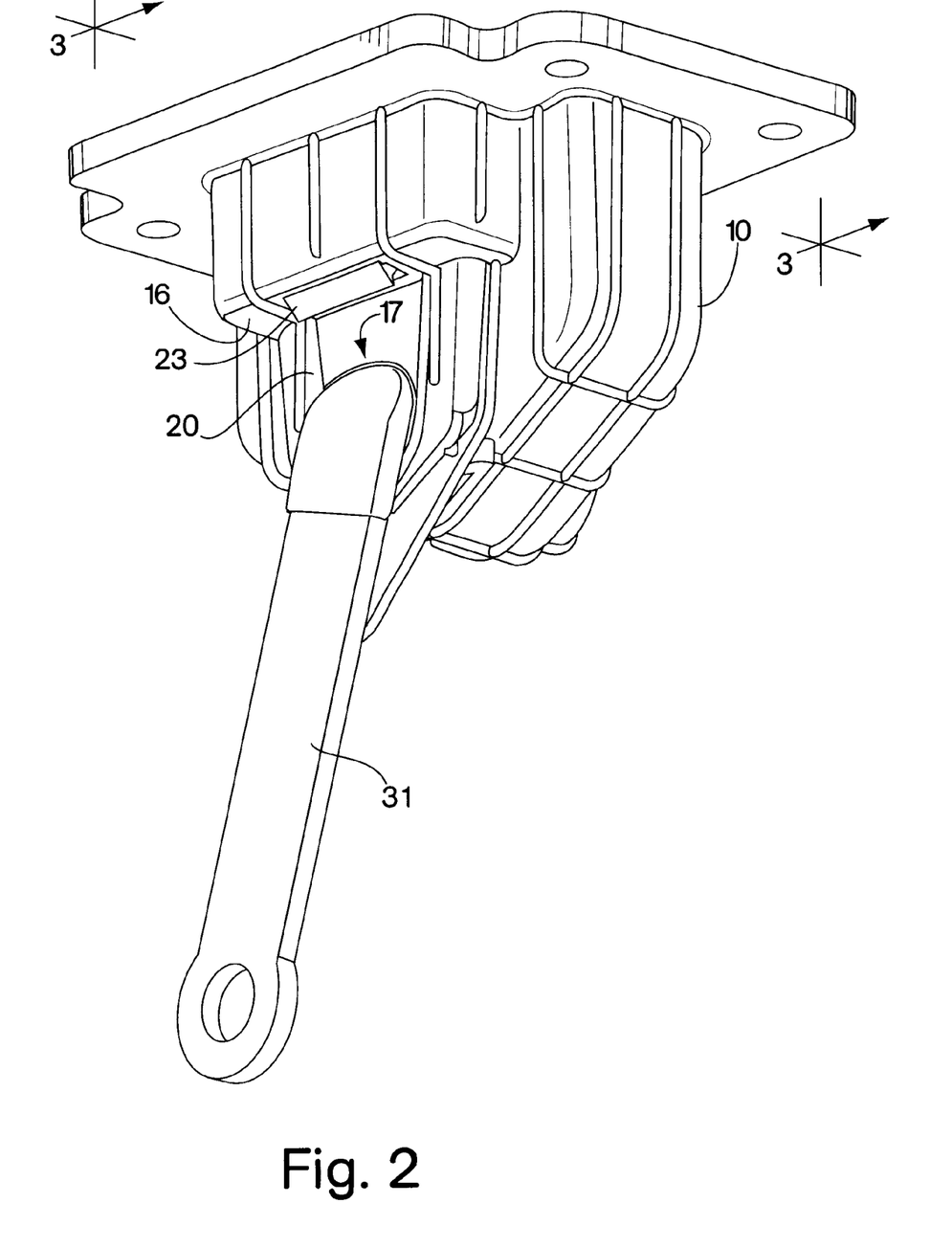
FIG. 2 is a perspective view of the shifter of FIG. 1, shown looking up toward the driver's compartment of a motor vehicle.

Referring now to the drawing in FIG. 1, a shift assembly or shifter 9 in an exploded perspective view. Housing 10 is positioned at the bottom of the drawing in FIG. 1, and is seen to have a top opening 11 and a side opening 18. A pivot cover 20 is attachable to the housing, preferably by having detent 23 extending from flexible projection 22 snap fit over ledge 16 of the housing. Preferably the housing and the cover are made of an injection molded engineering plastic. Optionally, fasteners 26 can extend through corresponding openings 19 in the pivot cover 20 and corresponding openings 27 (best seen in FIG. 5 in phantom cross section) in the housing and may be used to tightly secure the pivot cover to the housing. The housing 10 has a first bearing surface 14 and the pivot cover 20 has a second bearing surface 15. When assembled, as shown in FIG. 2, the bearing surfaces form a slot 17 sized to receive a cylindrical surface 35 of the pivot block 33. That is, the slot 17 is formed as a portion of the side opening 18. A second cylindrical surface 36 fits within a blind pivot hole or pocket 12 (Seen in FIGS. 3–5). The pocket 12 provides another bearing surface to absorb loading from the pivot block as it pivots. Advantageously, no separate bearing components are required.

A lever assembly 30 comprises an upper lever 32, attached to a pivot block 33, and a lower lever 31. The lower lever has a taper 34 which allows for clearance during assembly. In accordance with a highly advantageous feature, preferably the pivot block 33 and the lower lever 31 are formed together as a unitary or one-piece construction. For example, the lower lever and pivot block 33 may be formed as a die cast part made of aluminum. Such a unitary construction is highly advantageous in that it eliminates the need for separate pins to connect the pivot block and lever together, thereby reducing parts and reducing overall costs.

FIG. 2 shows the transfer case shifter of FIG. 1 assembled, with the upper lever removed. Detent 23 sits over ledge 16 of the housing. The lower lever 31 pivots in slot 17 over its travel range in response to the actions of an operator on upper lever 32.

Figure 3:
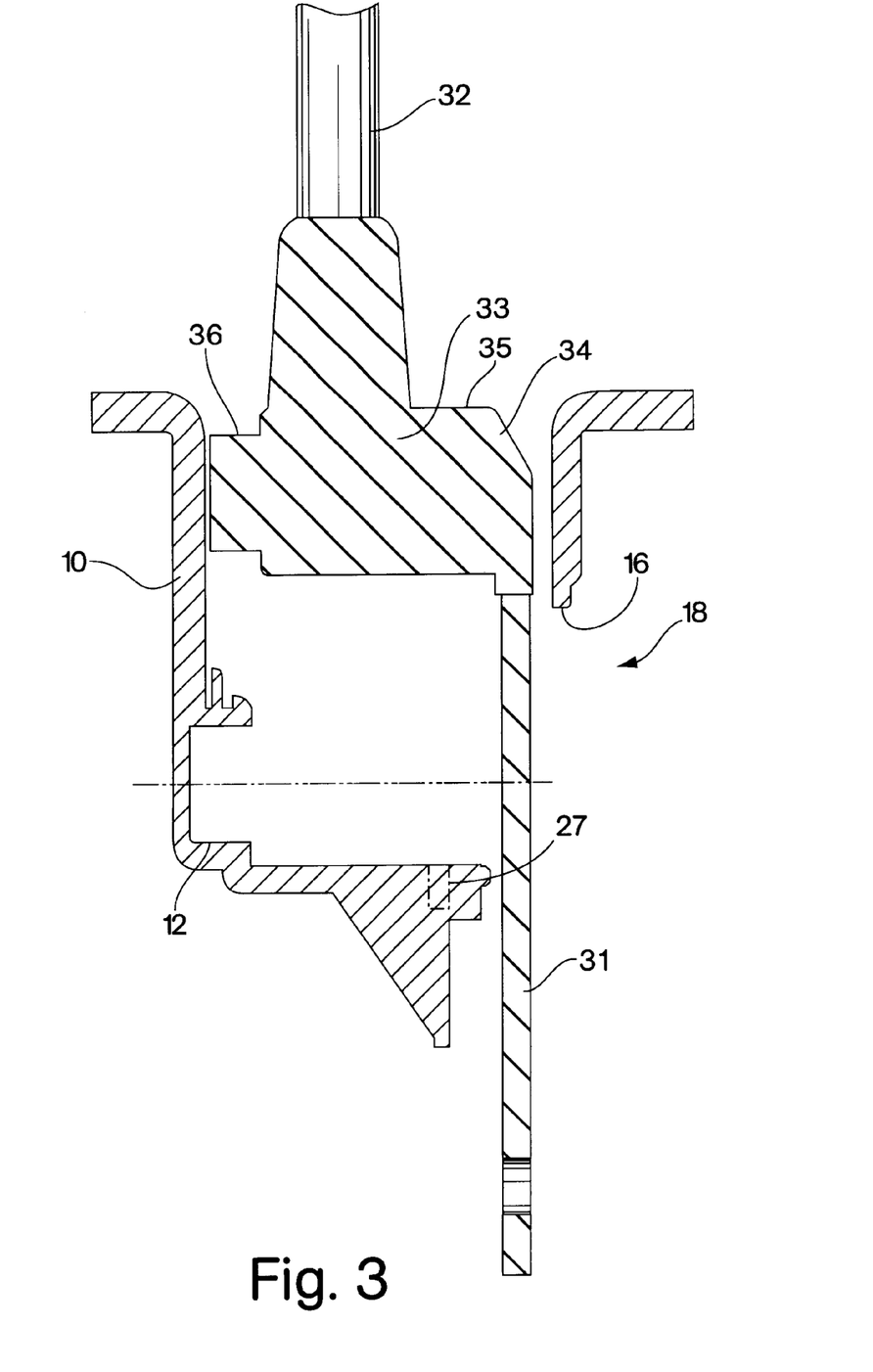
FIGS. 3–5 are cross section views of the embodiment of FIG. 1 taken through line 3—3 in FIG. 2, showing how the lever assembly is assembled with the housing and pivot cover.
Figure 4:
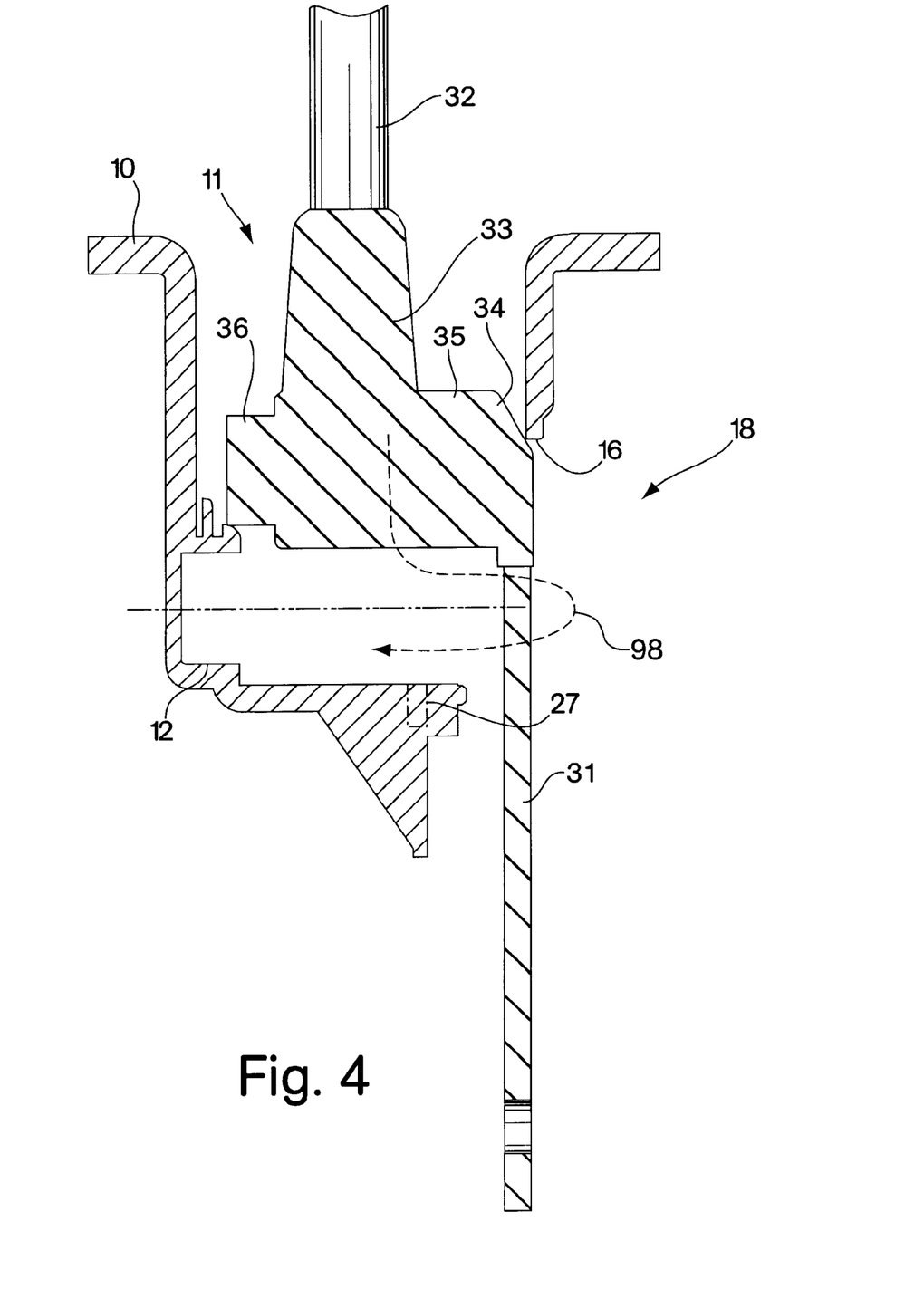
Figure 5:
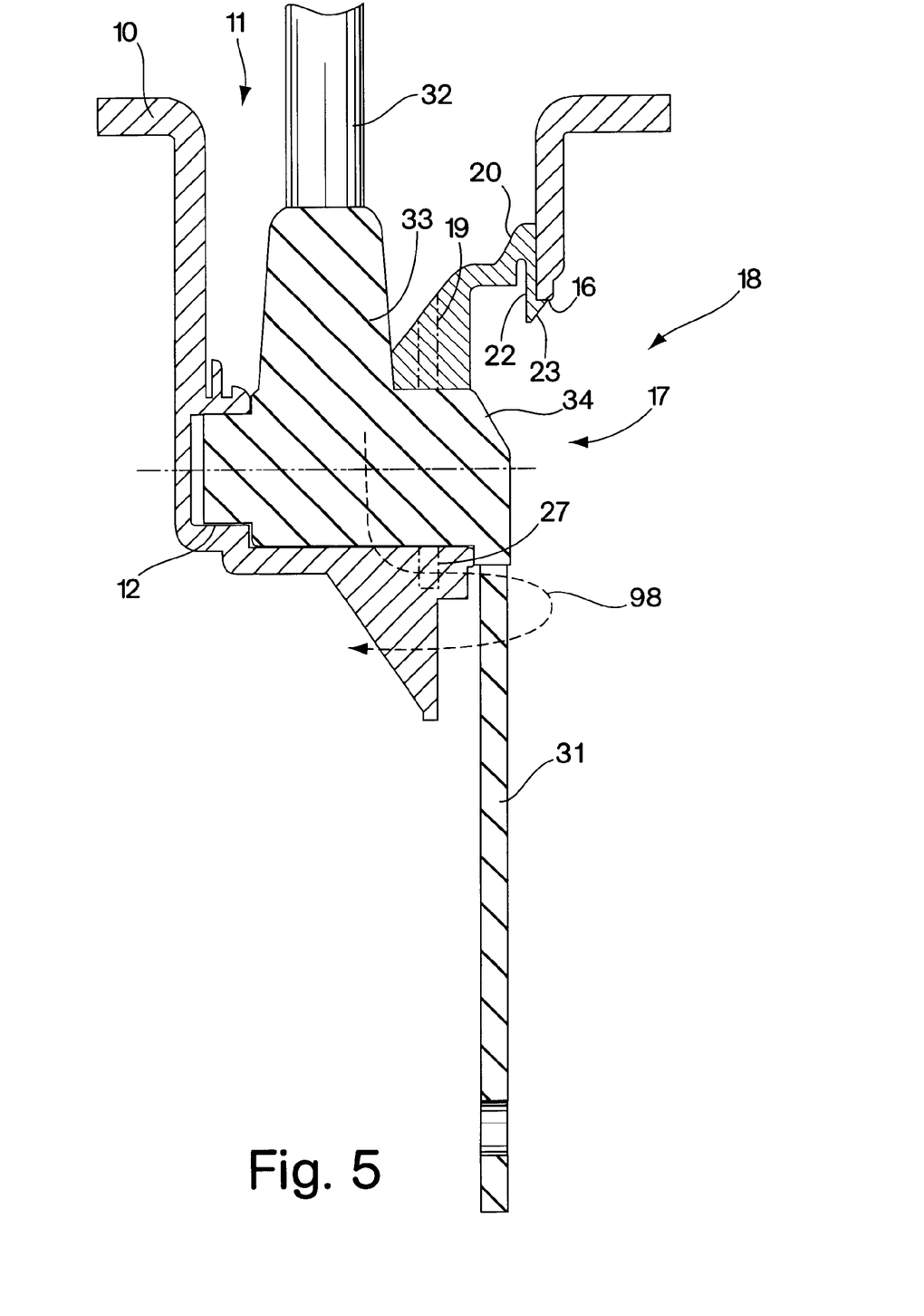

FIGS. 3–5 show a greatly improved and simplified assembly technique for shift assemblies, which the current design allows. The lever assembly 30, including the upper lever 32 attached to the unitary lower lever 21 pivot block 33 combination, is inserted through the top opening 11 into the central cavity of the housing until the lower lever 31 is threaded into the side opening 18. However, the edges of the blind pivot hole 12 temporarily block further travel. Taper 34 becomes important here in the assembly of this preferred embodiment. The taper 34 allows the pivot block 33 to clear the housing and the edge of the blind pivot 12 in the motion shown by the arrow 98 in FIG. 4. Once the cylindrical section 36 of the pivot block has cleared the edge of the blind pivot hole 12, the pivot block can be seated in the blind pivot hole. Pivot cover 20 can then be inserted through top opening 11 and snap fit into place with housing 10. Optionally, holes 19 may be provided on either side of the detent 23 in the pivot cover 20, and corresponding holes 27 may be provided in the housing to receive corresponding screws, bolts, fasteners, etc., to help secure the pivot cover to the housing.

By the term snap fit as applied to the pivot cover 20, it is meant that the flexible projection 22 is resiliently deformable as the detent 23 moves over the ledge 16, and then the detent moves into a positive locking engagement with the ledge as the two components are assembled together.

Figure 6:
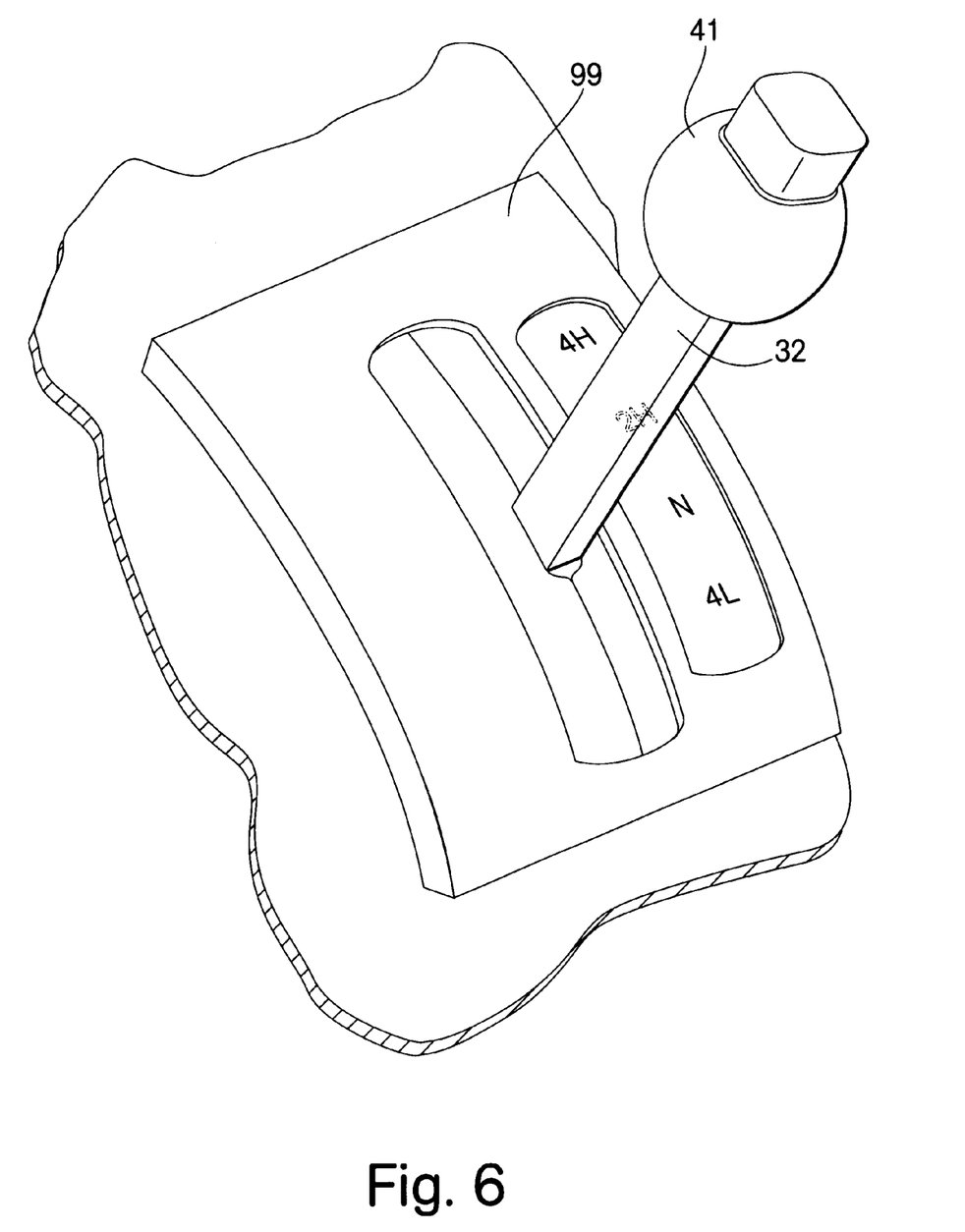
FIG. 6 is an example of a bezel for a transfer case shifter, in accordance with the preferred embodiment of FIG. 1.
Figure 7:
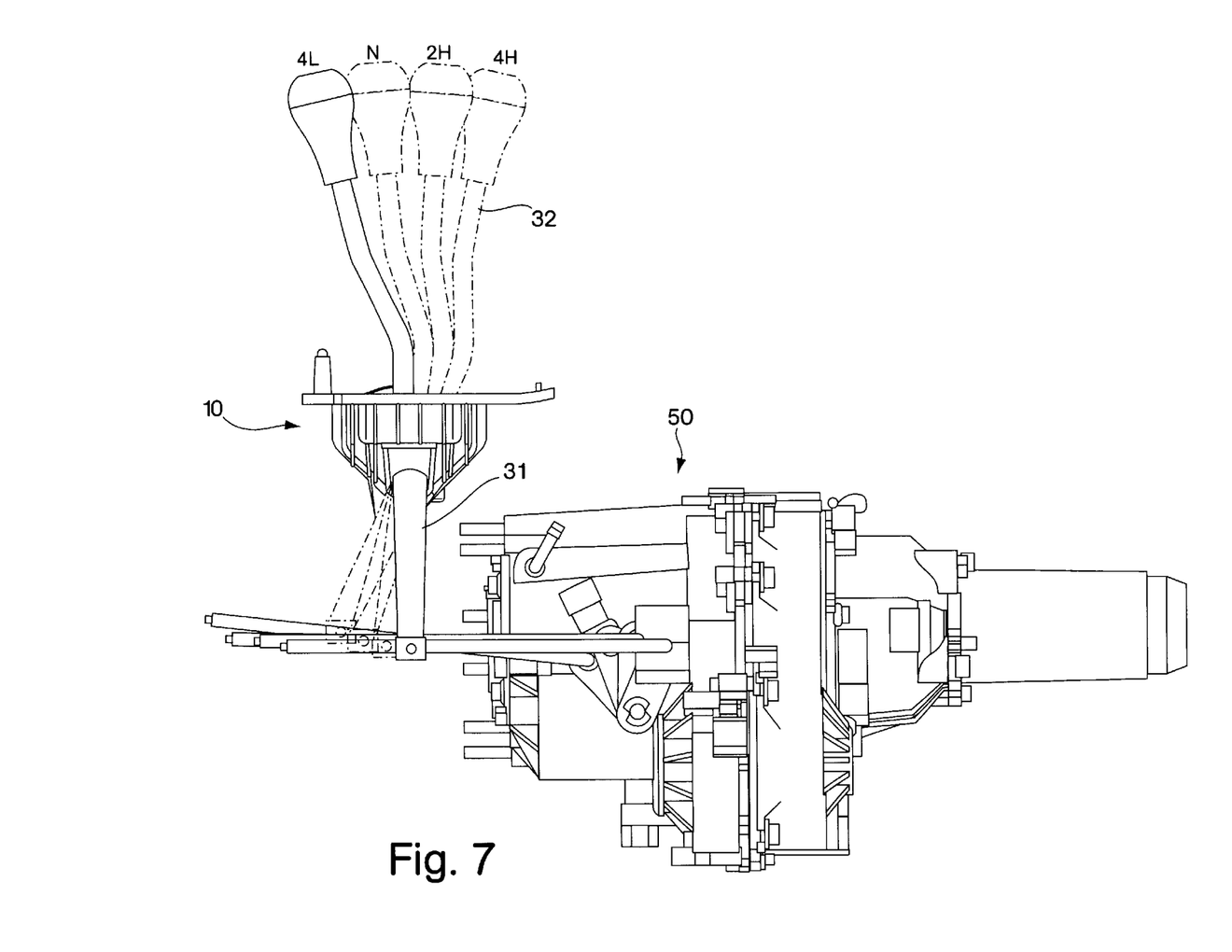
FIG. 7 shows a side view of the embodiment of FIG. 1 in assembly with a transfer case, indicating the positions of the shifter with respect to the transfer case.

FIG. 6 shows a view of the shift assembly of the preferred embodiment of FIG. 1. Upper lever 32 is connected to shifter knob 41. A bezel assembly 99 indicates the several different transfer case shifter positions: 4H, 4L, N and 2H. FIG. 7 shows the shift assembly 9 of the preferred embodiment of FIG. 1 attached to the transfer case 50. Three of the four positions of FIG. 6 for the transfer case shifter are shown in phantom.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A shift assembly comprising, in combination:

a housing having a top opening, and a side opening;

a lever assembly comprising an upper lever a lower lever, and a pivot block connecting the upper lever and the lower lever, wherein the pivot block is pivotably mounted in the housing and the lever assembly extends through the top opening; and a pivot cover which cooperates with the housing to define a slot and to pivotably mount the pivot block, and the lever assembly extends through the slot, wherein the pivot cover is connected to the housing by snap fit.

2. The shift assembly of claim 1 wherein at least one of the pivot cover and the housing has a flexible projection and a detent at one end, and the other of the pivot cover and the housing has a surface, and the detent snaps onto the surface to secure the pivot cover to the housing.

3. The shift assembly of claim 1 wherein the pivot block is unitary with the lower lever.

4. The shift assembly of claim 1 wherein the pivot block extends through the side opening in the housing and the upper lever extends through the top opening.

5. The shift lever of claim 1 further comprising a tapered section on the lower lever permitting clearance when the lower lever is inserted through a side opening.

6. The shift lever of claim 1 wherein a pocket is formed as a unitary portion of the housing, and a cylindrical section of the pivot block pivots in the pocket.

7. The shift lever of claim 1 wherein a first bearing surface on the housing cooperates with a second bearing surface on the pivot cover to support the pivot block.

8. A shift assembly comprising, in combination:

a housing having a first opening, a second opening and a pocket;

an upper lever operatively connected to a lower lever at a pivot block, the lower lever being adapted to connect to a transfer case; and a pivot cover which cooperates with the housing to define a generally cylindrical bearing surface which cooperates with the pocket to support the pivot block; wherein the pivot cover is connected to the housing by snap fit.

9. The shift assembly of claim 8 wherein the first opening is sized to permit the lower lever to pass through and sized to permit the pivot block to pass into and not through.

10. A shift assembly comprising, in combination:

a housing having a top opening and a side opening;

a lever assembly comprising an upper lever, a lower lever, and a pivot block, wherein the pivot block unitary with the lower lever and is pivotably mounted in the housing and the lever assembly extends through the top opening; and a pivot cover cooperating with the housing to define a slot, the slot being formed as part of the side opening; wherein the lever assembly extends through the slot.

11. The shift assembly of claim 10 further comprising a pocket formed in the housing, and a first bearing surface on the housing which cooperates with a second bearing surface on the pivot cover, wherein the pocket and the first and second bearing surfaces support the pivot block as it pivots.

* * * * *